(12) United States Patent
Chen et al.

(10) Patent No.: US 12,537,068 B2
(45) Date of Patent: Jan. 27, 2026

(54) HALF GOOD BLOCK HANDLING WITH DEFECTIVE DECK PRE-PROGRAMING IN A MEMORY SUB-SYSTEM

(71) Applicant: Micron Technology, Inc., Boise, ID (US)

(72) Inventors: Hanping Chen, San Jose, CA (US); Zhongguang Xu, San Jose, CA (US); Christina Papagianni, San Jose, CA (US); Yu-Chung Lien, San Jose, CA (US); Zhenming Zhou, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 132 days.

(21) Appl. No.: 18/619,094

(22) Filed: Mar. 27, 2024

(65) Prior Publication Data

US 2024/0331784 A1    Oct. 3, 2024

Related U.S. Application Data

(60) Provisional application No. 63/456,726, filed on Apr. 3, 2023.

(51) Int. Cl.
*G11C 16/10* (2006.01)
*G11C 16/34* (2006.01)
*G11C 29/52* (2006.01)

(52) U.S. Cl.
CPC ........ *G11C 16/3459* (2013.01); *G11C 16/102* (2013.01); *G11C 29/52* (2013.01)

(58) Field of Classification Search
CPC ... G11C 16/3459; G11C 16/102; G11C 29/52; G11C 16/0483; G11C 16/10
See application file for complete search history.

(56) References Cited

U.S. PATENT DOCUMENTS

| | | |
|---|---|---|
| 2012/0008410 A1 | 1/2012 | Huynh et al. |
| 2022/0059172 A1* | 2/2022 | Yu ............. G11C 16/3436 |
| 2023/0033870 A1 | 2/2023 | Namala et al. |
| 2023/0072467 A1 | 3/2023 | Thiers et al. |

FOREIGN PATENT DOCUMENTS

KR    20220018060 A    2/2022

OTHER PUBLICATIONS

International Search Report and Written Opinion for International Application No. PCT/US2024/022680, mailed Jul. 29, 2024, 11 pages.

* cited by examiner

*Primary Examiner* — Xiaochun L Chen
(74) *Attorney, Agent, or Firm* — Lowenstein Sandler LLP (57) ABSTRACT

A defective portion of a block of a memory device is identified. The defective portion of the block is programmed with a pre-programming voltage pattern. The pre-programming voltage pattern is programmed to the defective portion of the block before a programming operation is performed on a non-defective portion of the block. A verification operation is caused to be performed on the defective portion of the block.

20 Claims, 8 Drawing Sheets

HALF GOOD BLOCK HANDLING WITH DEFECTIVE DECK PRE-PROGRAMING IN A MEMORY SUB-SYSTEM

RELATED APPLICATION

This application claims the benefit of U.S. Provisional Application No. 63/456,726 filed Apr. 3, 2023, the entire contents of which are hereby incorporated by reference.

TECHNICAL FIELD

Embodiments of the disclosure relate generally to memory sub-systems, and more specifically, relate to half good block handling with defective deck pre-programming in a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the present disclosure are directed to half good block handling with defective deck pre-programming in a memory sub-system. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. For example, NAND memory, such as 3D flash NAND memory, offers storage in the form of compact, high density configurations. A non-volatile memory device is a package of one or more dies, each including one or more planes. For some types of non-volatile memory devices (e.g., NAND devices), each plane includes of a set of physical blocks. Each block includes of a set of pages. Each page includes of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1," or combinations of such values.

A memory device can be made up of bits arranged in a two-dimensional or a three-dimensional grid. Memory cells are formed onto a silicon wafer in an array of columns (also hereinafter referred to as bitlines) and rows (also hereinafter referred to as wordlines). A wordline can refer to one or more rows of memory cells of a memory device that are used with one or more bitlines to generate the address of each of the memory cells. The intersection of a bitline and wordline constitutes the address of the memory cell. A data block hereinafter refers to a unit of the memory device used to store data and can include a group of memory cells, a wordline group, a wordline, or individual memory cells. Each data block can include a number of sub-blocks, where each sub-block is defined by a set of associated pillars (e.g., one or more vertical conductive traces) extending from a shared bit line. Memory pages (also referred to herein as "pages") store one or more bits of binary data corresponding to data received from the host system. To achieve high density, a string of memory cells in a non-volatile memory device can be constructed to include a number of memory cells at least partially surround a pillar of channel material. The memory cells can be coupled to access lines, which are commonly referred to as "wordlines," often fabricated in common with the memory cells, so as to form an array of strings in a block of memory. The compact nature of certain no-volatile memory devices, such as 3D flash NAND memory, means wordlines are common to many memory cells within a block of memory.

A desire for increased storage capacity in memory devices drives an expansion of block sizes, including an increase of the number of wordlines in each block. The presence of additional wordlines, however, presents certain challenges, including, for example, performance, and reliability penalties attributable to various inefficiencies (e.g., associated with garbage collection or other media management operations for the increased block size). Certain memory devices are thus divided into multiple segments, sometimes referred to as "decks." For example, a memory device could include an upper (or "top") deck and a lower (or "bottom") deck, each including a respective set of wordlines from the block. The separate decks are individually accessible so that a memory access operation (i.e., a program, read, or erase operation) can be performed on one deck without impacting memory cells of the other deck.

When a memory access operation is performed on one deck, the state of the memory cells in the other deck can be preserved. During a programming operation on one deck, for example, a selected memory cell(s) can be programmed by applying a programming voltage to a selected wordline. Because a common wordline connects multiple memory cells, unselected memory cells on the wordline can be subject to the same programming voltage as the selected memory cell(s). Without preventive measures, the unselected memory cells can experience effects from applying the programming voltage to the common wordline. These programming voltage effects can include changes in condition of the charge being stored in the unselected memory cells which are expected to maintain stored data, and is termed a "programming disturbance" or "program disturb" effect. The program disturb effect can render the charge stored in the unselected memory cell(s) entirely unreadable or, although still apparently readable, the charge can be read as a data value different from the intended data value stored before application of the programming voltage.

Certain programming algorithms can mitigate program disturb and related effects by programming the memory cells in a memory string from a drain end of the memory string to a source end of the memory string (e.g., from top to bottom). As the programming algorithm progresses, memory cells associated with wordlines above the selected wordline (i.e., the wordline currently being programmed) have already been programmed, while the memory cells associated with wordlines below the selected wordline have not yet been programmed (e.g., are in an erased state). Thus, top-down programming algorithms are designed to prioritize decreasing or even eliminating program disturb effects on the memory cells associated with wordlines above the selected wordline, with less focus on any impact on memory cells associated with wordlines below the selected wordline. Using these programming algorithms on a memory device with multiple decks, however, can introduce additional challenges, since the memory strings span the multiple decks. For example, in a situation where memory cells in the bottom deck have been previously programmed, a top-down programming algorithm might disregard memory cells associated with wordlines below the selected wordline are in a programmed state by prioritizing wordlines above the selected wordline. As noted above, the programming algorithms do not account for such a situation and program disturb effects can be introduced in the bottom deck, potentially hurting reliability of the data stored there.

Other phenomena can affect the charge of a memory cell, including slow charge loss (SCL). For example, SCL represents the change to the threshold voltage ($V_T$) of the memory cell with respect to time as the electric charge of the cell degrades (e.g., as the voltage shifts). The threshold voltage shift from SCL can be referred to as "temporal voltage shift," since the degrading electric charge causes the voltage distributions to shift along the voltage axis towards lower voltage levels as a function of time. The threshold voltage changes rapidly at first (e.g., immediately after the memory cell was programmed), and then slows down in an approximately logarithmic linear fashion with respect to the time elapsed since the cell programming event. The programmed state of adjacent wordlines can also affect the charge of the memory cell. For example, due to the close proximity of the memory cells in adjacent wordlines, the charge of memory cells in a wordline can shift up over time when memory cells in an adjacent wordline have been programmed with a high charge.

Defects in memory devices can impact device performance, reliability, and capacity, and by separating memory devices into multiple decks, new potential points for defects can be introduced. For example, due to various factors, such as a manufacturing error, the top deck of a block can be functional while the bottom deck is defective, or the bottom deck of the block can be functional while the top deck is defective. Some systems can partially recover these "half good" blocks (i.e., blocks with either a non-defective top deck or a non-defective bottom deck). In a memory device that is programmed using a top-down programming algorithm (i.e., where the top deck of the block is programmed before the bottom deck of the block), there is no need to consider preventing read disturb or other potential voltage shift phenomena, and thus non-defective top decks can be programmed by halting the programming algorithm when a defective bottom deck is encountered. In some instances, defective bottom decks can subsequently be treated (e.g., for example, programmed with a specific voltage pattern) to have a minimal effect on the charges of the non-defective top deck (i.e., the stored data) by the top-down programming algorithm.

However, this same process does not work in the reverse, i.e., where the top deck of the block is defective, and the bottom deck of the block is non-defective. For example, as the bottom deck is independently accessible for memory access operations, the non-defective bottom deck can be programmed independently (e.g., similar to programming the non-defective top deck in the previous example). Attempting to treat the top deck to have a minimal effect on the non-defective bottom deck can cause the bottom deck to experience program disturb effects, because the top-to-bottom programming algorithm could prioritize the programmed junk memory cells of the defective top deck over functioning programmed memory cells of the non-defective bottom deck. As a result, even systems that partially recover blocks with non-defective top decks can mark blocks with a defective top deck and non-defective bottom deck as bad blocks and remove the blocks from accessible memory because of theses programming issues. Thus, instead of simply losing functionality of fully defective blocks (e.g., blocks with defective top decks and defective bottom decks), the functionality of blocks with non-defective bottom can also be lost.

Aspects of the present disclosure address the above and other deficiencies by implementing a half good block handling technique to pre-program defective decks on a multi-deck memory device. A non-sequential deck can refer to a deck that, due to the programming algorithm, is due to be programmed after a sequential deck. For example, in a block with a top deck and a bottom deck where the block is programmed by a top-down programming algorithm, the top deck could be the sequential deck (e.g., an intervening deck), and the bottom deck could be the non-sequential deck. In another example, in a block with a top deck, a middle deck, and a bottom deck, where the block is programmed by a top-down programming algorithm, the top deck could be the intervening deck, the middle deck and the bottom deck could both be non-sequential decks. In some embodiments where the bottom deck is a non-sequential deck, the middle deck could also be an intervening deck. In order to program the non-sequential deck while minimizing the negative programming effects, a processing device can pre-program a voltage pattern to the intervening deck(s). The voltage pattern can be a certain voltage distribution, voltage level, etc., and can be selected based on physical characteristics of the memory device. The voltage pattern can be selected as a pattern which when programmed to a defective deck, can cause minimal voltage shift to an adjacent non-defective deck. Pre-programming can be performed during the memory manufacturing stage, or in conjunction with memory access operations such as an erase operation, program operation, etc. Due to various voltage shift effects described above (e.g., SCL, etc.), and/or effects such as program disturb, the voltage pattern programmed to the intervening deck(s) (e.g., defective decks) can change over time. The processing device can detect these changes to the threshold voltage of the defective deck(s) and re-program the defective deck(s) with the pre-programming voltage pattern. The defective decks can be pre-programmed at a time, or in a way to minimize program disturb effects on data stored on lower decks (e.g., a bottom deck).

The pre-programming voltage pattern can be programmed to the defective portion of the block any time before a programming operation is performed. This includes, for example, during manufacture of the memory device (e.g., as an "out-going pattern" from a manufacturing environment), immediately preceding a program operation, or after an erase operation. Performing the pre-programming operation during manufacture of the memory device can reduce the performance impact on subsequent memory access operations performed on the memory device in comparison to the other two indicated options. Performing the pre-programming operation immediately preceding a program operation can allow the controller to precisely control the read window budget (RWB) of the subsequently programmed data, but at the expense of an impact to the performance of the program operation, because of the increased latency from an extra programming operation (i.e., the programming operation on the defective portion of the block). Performing the pre-programming operation after an erase operation does not negatively impact the performance of a programming operation, but does negatively impact the overall memory device performance by negatively impacting the performance of the erase operation (e.g., by adding additional latency to the erase operation).

A voltage distribution monitor can be used when the pre-programming voltage pattern is programmed after the erase operation or as an out-going pattern when the memory device is manufactured. A voltage distribution monitor might not be necessary when the pre-programming voltage pattern is programmed immediately preceding the program operation because there will not be enough time between the two programming operations for the pre-programming voltage pattern to shift in a significant way. A voltage distribution monitor can be used to determine when the voltage distribution shifts outside of a pre-determined acceptable range. In some embodiments, the voltage distribution monitor can refer to or include specialized equipment, and/or verification operation(s) as further described below with reference to FIG. 5A and FIG. 5B.

Advantages of the present disclosure include, but are not limited to, improved performance in the memory device. In the manner described herein, a drain-to-source (i.e., top to bottom) programming algorithm (e.g., a top-down programming algorithm) can be used effectively in a multi-deck memory device to program bottom decks when top deck(s) are defective. The voltage distributions of the non-defective bottom decks can be minimally affected by the voltage pattern programmed to the defective top deck(s). In one embodiment, a reliably programmed bottom deck below a defective top deck can improve memory device performance by reducing losses due to defective portions of the memory device.

Figure 1:
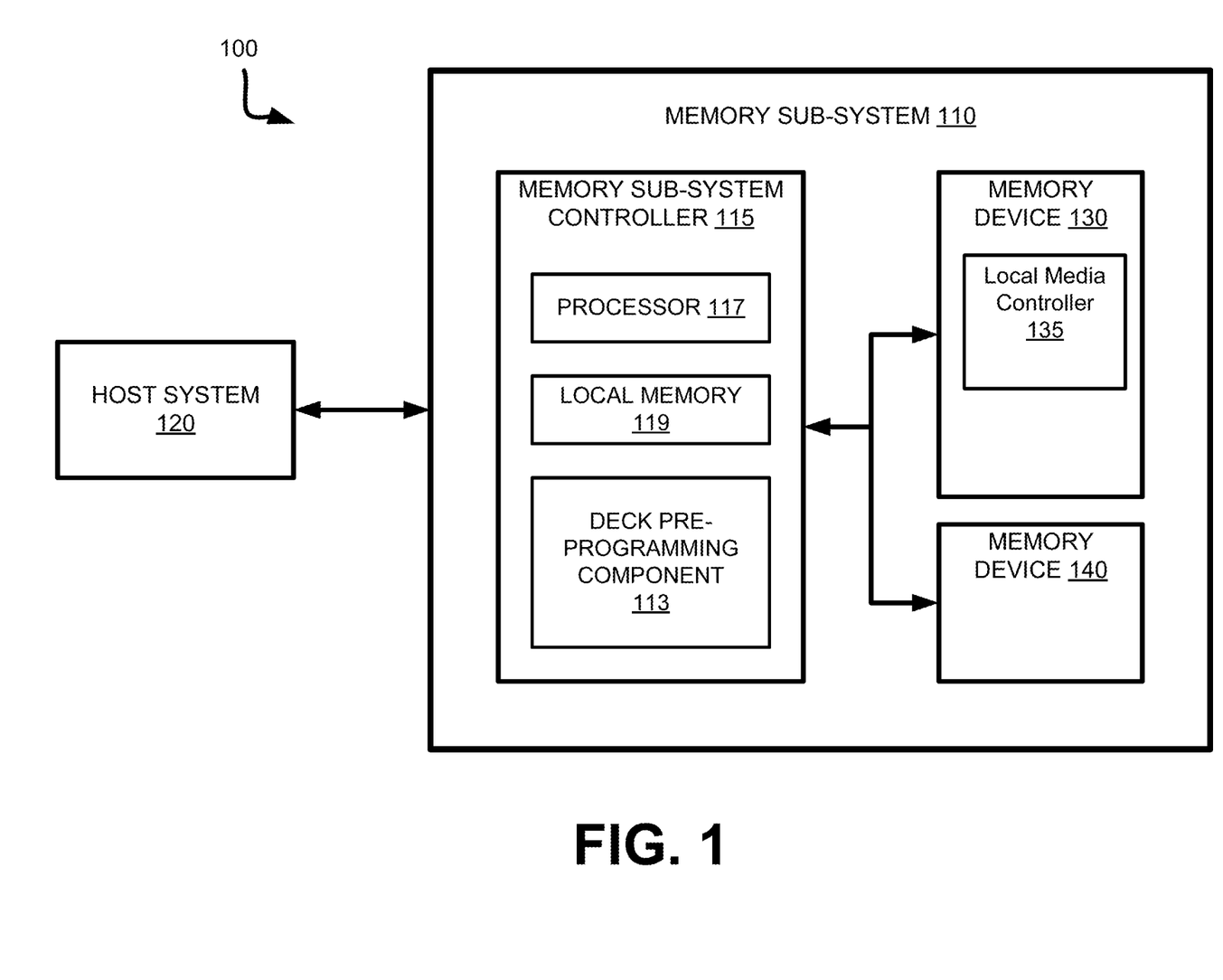
FIG. 1 illustrates an example computing system that includes a memory sub-system in accordance with some embodiments of the present disclosure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a not-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), not-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The memory sub-system 110 includes a deck pre-programming component 113 that can program and access half-good blocks in a memory device by pre-programming the defective block with a voltage pattern. In some embodiments, the memory sub-system controller 115 includes at least a portion of the deck pre-programming component 113. In some embodiments, the deck pre-programming component 113 is part of the host system 120, an application, or an operating system. In other embodiments, local media controller 135 includes at least a portion of deck pre-programming component 113 and is configured to perform the functionality described herein.

The deck pre-programming component 113 can pre-program defective parts of blocks (i.e., decks) such that non-defective block decks can be used without experiencing data loss or corruption. To do this, deck pre-programming component 113 can pre-program a voltage pattern to the defective deck of the block before data is written to a lower deck (e.g., the bottom deck). Deck pre-programming component 113 can pre-program the voltage pattern to the defective deck any time before programming the lower deck. As described above, this time can include, for example, during production of the memory device (i.e., in a manufacturing environment), shortly before a routine memory access operation (e.g., before a program operation for programming the data intended to be stored at an adjacent non-defective deck), or shortly after a routine memory access operation (i.e., after an erase operation or garbage collection operation). In one embodiment, the pre-programming voltage pattern can correspond to programming memory cells of the defective deck (i.e., the top deck) to a level 2 voltage distribution. Further details regarding the operations of the deck pre-programming component 113 are described below.

Figure 2A:
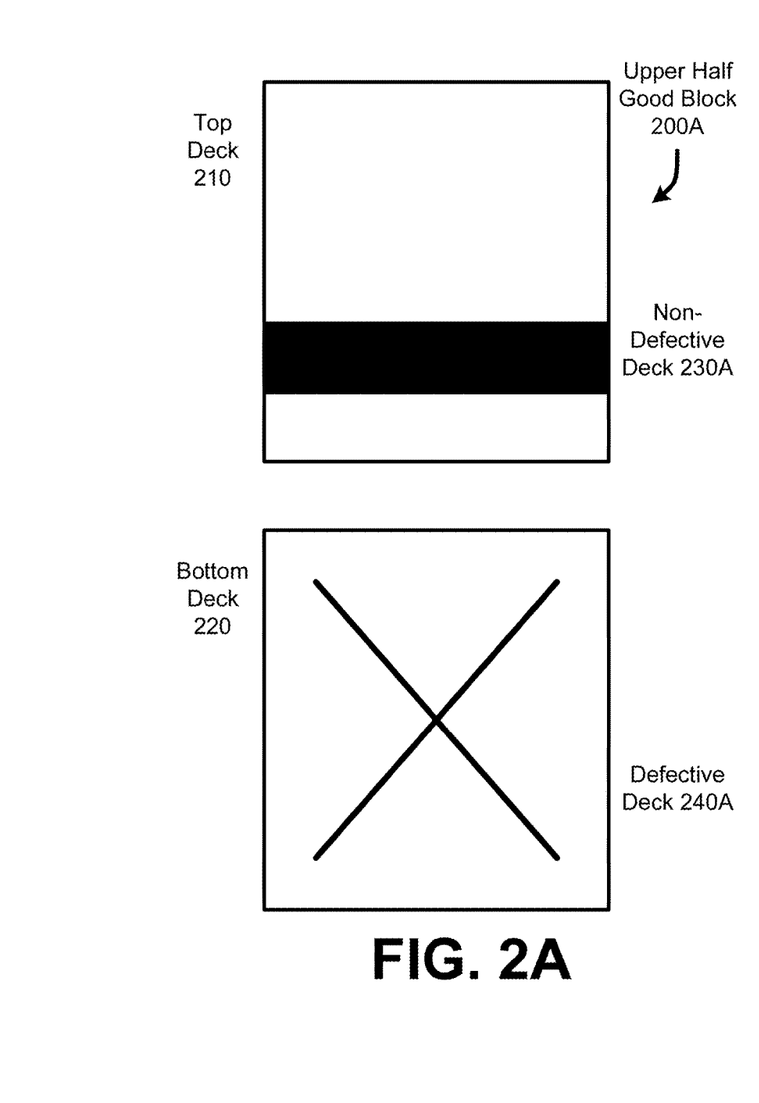
FIG. 2A illustrates an example of an upper half good block, in accordance with some embodiments of the present disclosure.

FIG. 2A illustrates an example of an upper half good block 200A, in accordance with some embodiments of the present disclosure. Upper half good block 200A can include top deck 210 and bottom deck 220. Top deck 210 of upper half good block 200A can be a non-defective deck 230A. Bottom deck 220 of upper half good block 200A can be a defective deck 240A. As a non-defective deck 230A, top deck 210 can include wordline 250. As a defective deck 240A, bottom deck 220 might not be able to reliably store and return a programmed data value(s).

Figure 2B:
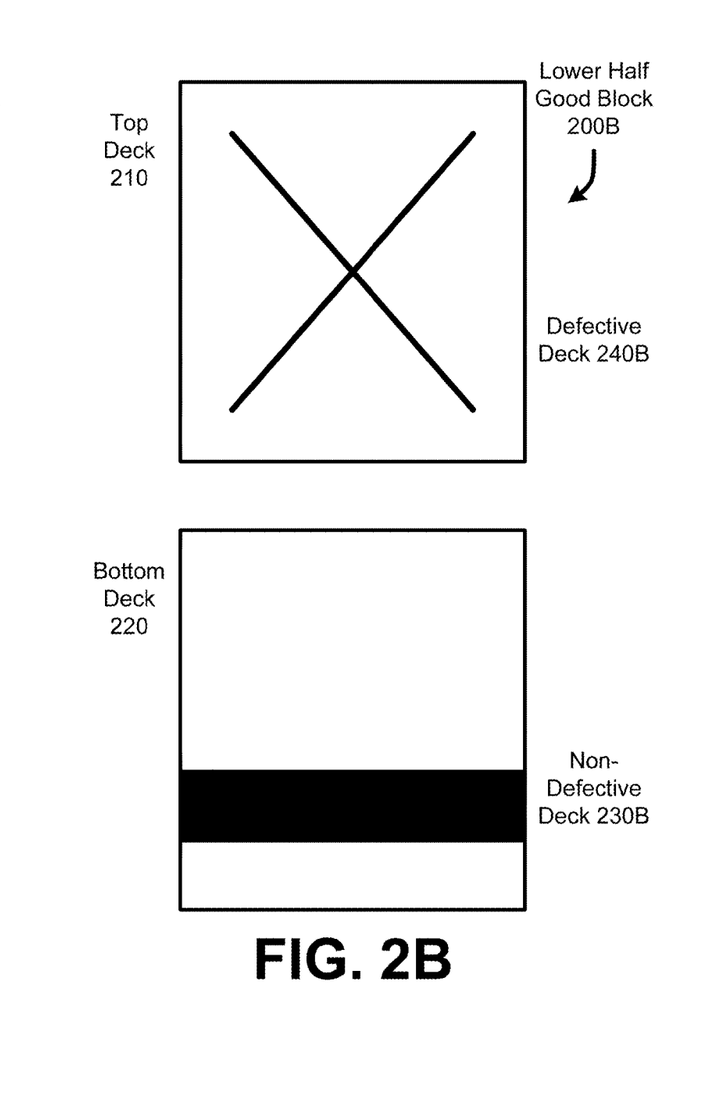
FIG. 2B illustrates an example of a lower half good block, in accordance with some embodiments of the present disclosure.

FIG. 2B illustrates an example of a lower half good block 200B, in accordance with some embodiments of the present disclosure. Lower half good block 200B can include top deck 210 and bottom deck 220. Top deck 210 of lower half good block 200B can be a non-defective deck 230B. Bottom deck 220 of lower half good block 200B can be a defective deck 240B. As a defective deck 240B, top deck 210 might not be able to reliably store and return a programmed data value(s). As a non-defective deck 230B, bottom deck 220 can include wordline 250.

A controller can program data received from a host to the non-defective deck 230A/230B (e.g., a controller such as memory sub-system controller 115 or local media controller 135 and a host such as host system 120 as described with respect to FIG. 1, respectively). The controller can program the pre-programming voltage pattern to the defective deck 240A/240B. In some embodiments with a top-down programming algorithm, as described above, the controller can pre-program the top deck 210 of lower half good block 200B (i.e., defective deck 240B) with the pre-programming voltage pattern before programming the bottom deck 220 (i.e., non-defective deck 230B). In some embodiments where the programming algorithm programs from bottom-to-top (i.e., opposite to the programming algorithm described above), the controller can pre-program the bottom deck 220 of upper half good block 200A (i.e., defective deck 240A) with the pre-programming voltage pattern before programming the top deck 210 (i.e., non-defective deck 230A).

Defective deck 240A/240B can be defective due to manufacturing error, or can become defective during use of the memory device. For example, defective deck 240A/240B can occur as a result of a memory device process failure which causes a physical defect at the defective deck 240A/240B. In another example, repeated use of a deck during standard operation of the memory device can cause an otherwise functioning deck (i.e., non-defective deck 230A/230B) to become defective. In some embodiments, defective decks 240A/240B can be identified during production of the memory device. In some embodiments, defective decks 240A/240B can be identified by the controller.

Figure 3:
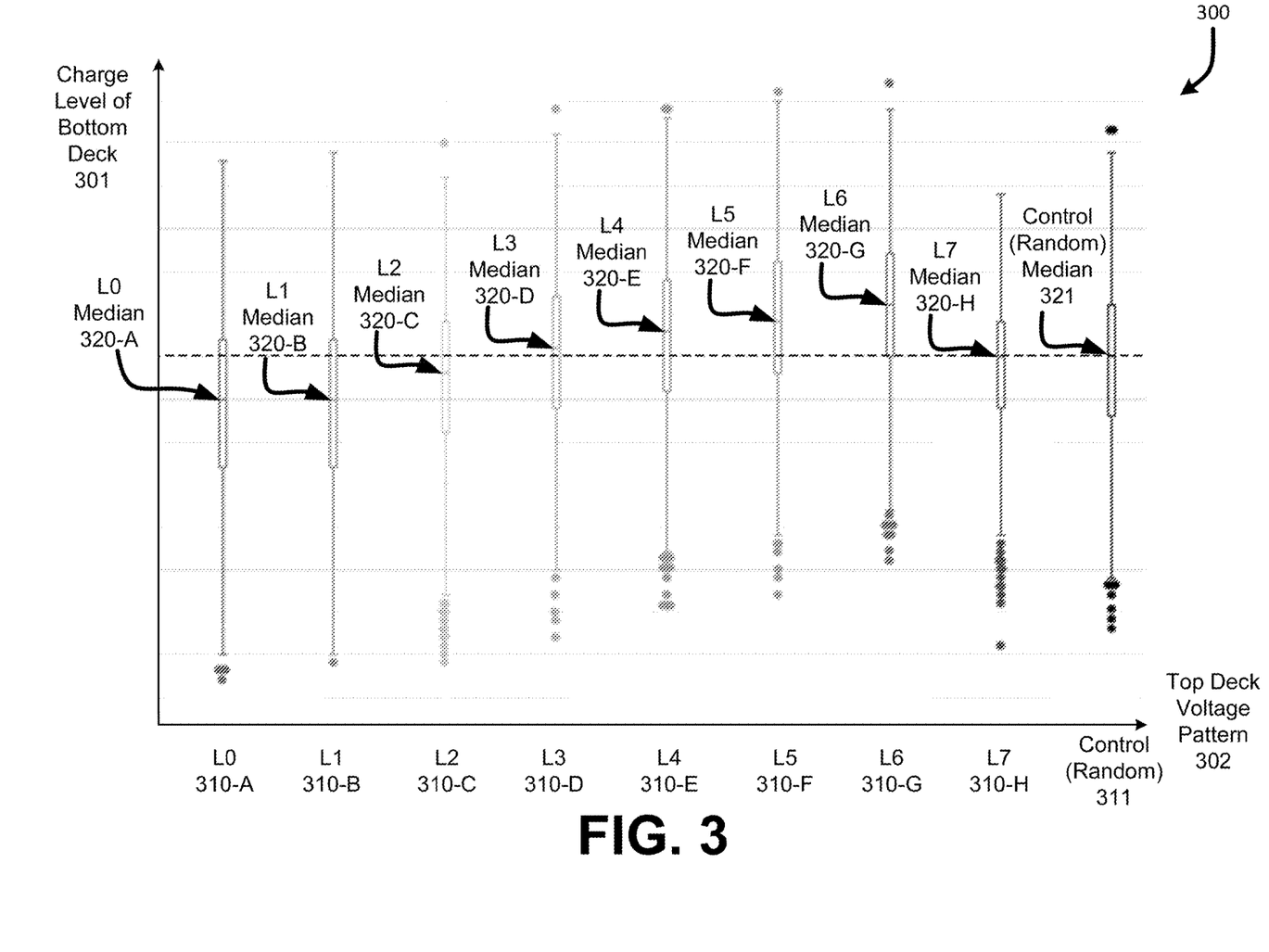
FIG. 3 illustrates an example of a box and whiskers plot depicting charge levels of a (non-defective) bottom deck with respect to various defective top deck voltage patterns, in accordance with some embodiments of the present disclosure.

FIG. 3 illustrates an example of a box and whiskers plot 300 of charge levels of a (non-defective) bottom deck 301 with respect to various defective top deck voltage patterns 302, in accordance with some embodiments of the present disclosure. In some embodiments, where a programming algorithm programs bottom-to-top, the non-defective deck can be the top deck, and the defective deck can be the bottom deck. The y-axis represents the charge level of the bottom deck 301 (i.e., the non-defective deck) and the x-axis represents the top deck voltage pattern 302. Each box and attached whiskers represents a distribution of the charge level of bottom deck 301 with respect to a corresponding top deck voltage pattern 302. Control (random) voltage pattern 311 is a representation of how a charge level of a non-defective deck is affected by another non-defective deck without a set pre-programming voltage pattern (e.g., in a block where both the top deck and the bottom deck are non-defective decks). Thus, control (random) median 321 can provide a benchmark for how a standard non-defective deck (e.g., a non-defective deck in a non-defective block of a memory device) is affected by programmed data during standard operations of the memory device. Voltage level plots of pre-programming voltage pattern 310 represent how a specific pre-programming voltage pattern 310 (e.g., L0 310-A, L1 310-B, L2 310-C, L3 310-D, L4 310-E, L5 310-F, L6 310-G, or L7 310-H) affects the charge level of the bottom deck 301. Thus, using control (random) voltage pattern 311 as a benchmark, the plot of the pre-programming voltage pattern 310 which corresponding to the best charge level of the bottom deck can be determined (e.g., level plot that most closely matches the control (random) voltage pattern 311). Median charge levels 320 can be compared with control (random) median 321 to determine which voltage pattern(s) correspond more closely to control (random) median 321. As depicted in box and whiskers plot 300, pre-programming voltage pattern 310-A, 310-B, and 310-C (i.e., L0, L1, and L2 respectively) have median charge levels 320 (i.e., 320-A, 320-B, and 320-C respectively) that fall below the control (random) median 321. As depicted in box and whiskers plot 300, pre-programming voltage pattern 310-D, 310-E, 310-F, and 310-G (i.e., L3, L4, L5, and L6 respectively) have median charge levels 320 (i.e., 320-D, 320-E, 320-F, and 320-G respectively) that sit above control (random) median 321. As depicted in box and whiskers plot 300, pre-programming voltage pattern 310-H (i.e., L7) has a median charge level 320 (i.e., 320-H) that falls on, or nearly on the line extending from control (random) median 321.

In some embodiments, the pre-programming voltage pattern 310 that causes the median charge level 320 of the bottom deck to fall below the control (random) median 321 can indicate that the given pre-programming voltage pattern 310 will have a minimal effect on the charge level of bottom deck 301. In some embodiments, the pre-programming voltage pattern 310 that causes the median charge level 320 of the bottom deck to rise above the control (random) median 321 can indicate that the given charge level will have a minimal effect on the charge level of bottom deck 301. In some embodiments, the pre-programming voltage pattern 310 that causes the median charge level 320 of the bottom deck to be closest to the control (random) median 321 can indicate that the given pre-programming voltage pattern 310 will have a minimal effect on the charge level of bottom deck 301 (i.e., where the magnitude of the voltage difference between the corresponding median charge level 320 and the control (random) median 321 is smallest). In some embodiments, the charge distribution plots of pre-programming voltage pattern 310 as shown in box and whiskers plot 300 can be one of multiple indicators as to which pre-programming voltage pattern 310 (i.e., L0-L7) will have a minimal effect on the charge level of bottom deck 301.

Figure 4A:
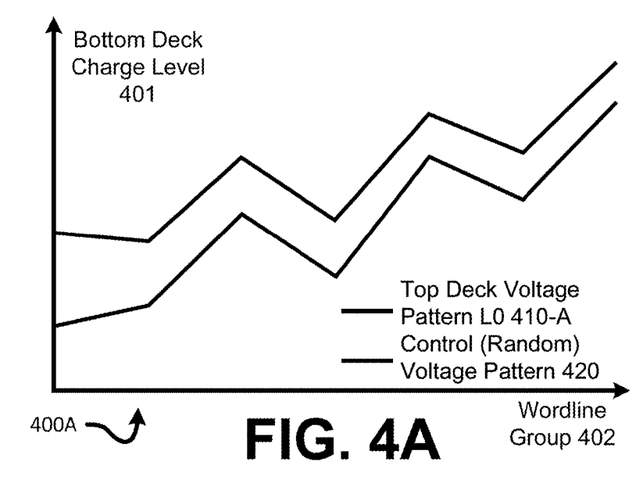
FIGS. 4A-4H illustrate example graphs depicting a non-defective bottom deck charge level with respect to a given defective top deck voltage pattern, in comparison to a control (random) pattern, in accordance with some embodiments of the present disclosure.
Figure 4B:
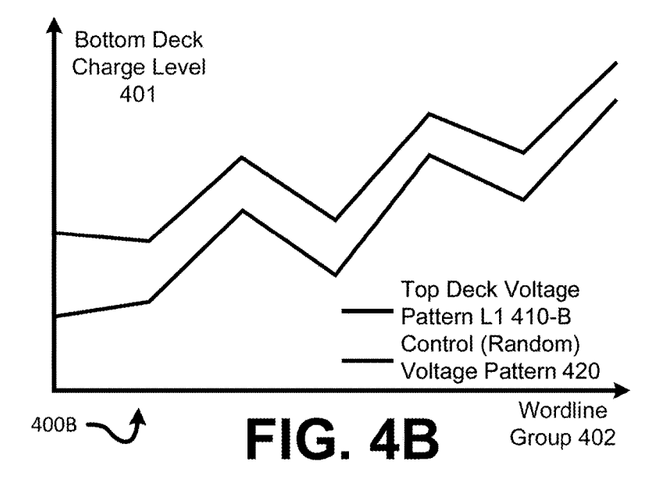
Figure 4C:
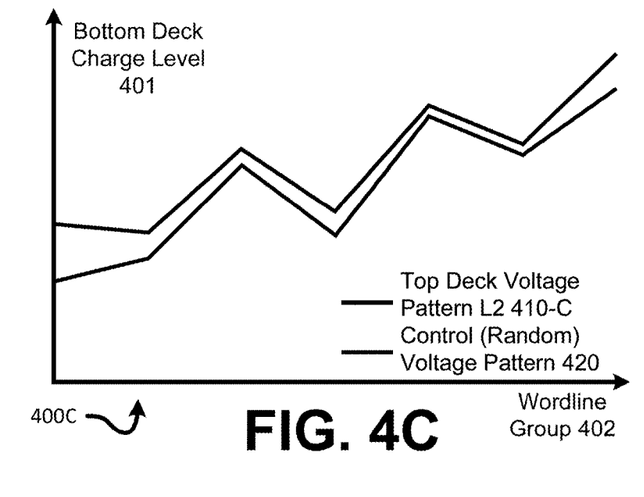
Figure 4D:
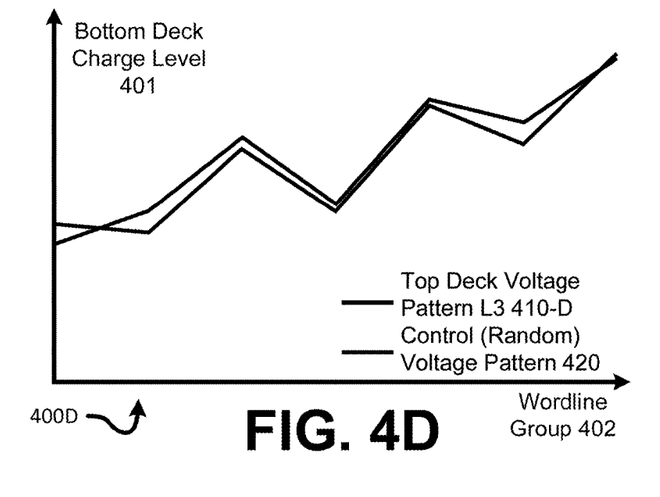
Figure 4E:
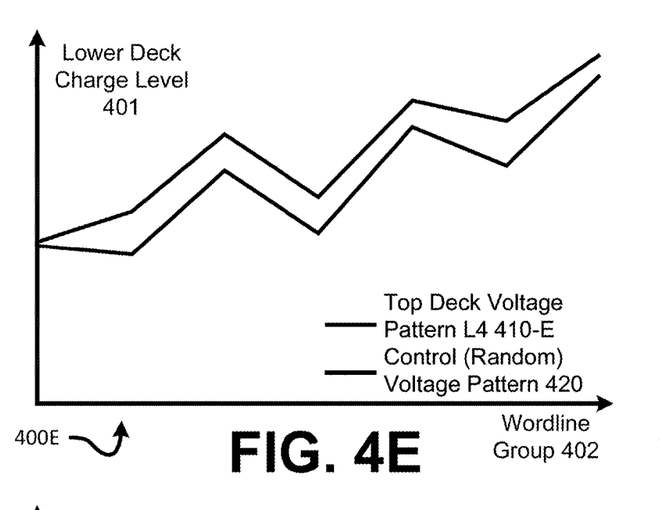
Figure 4F:
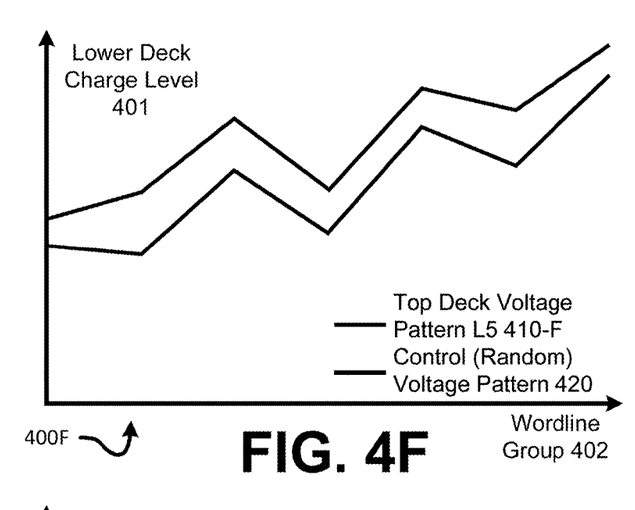
Figure 4G:
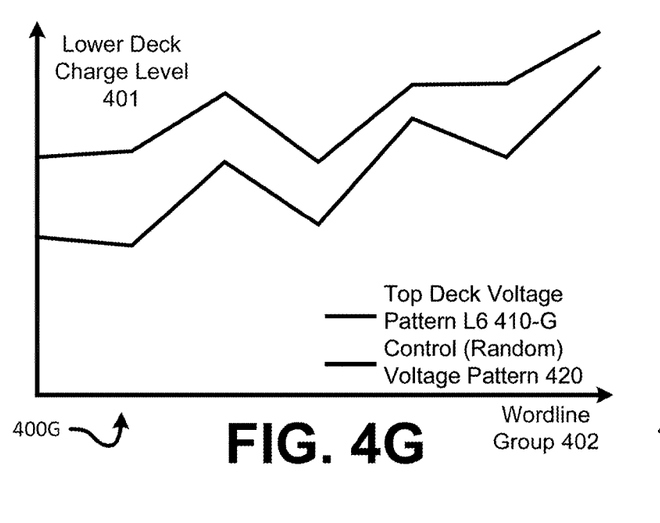
Figure 4H:
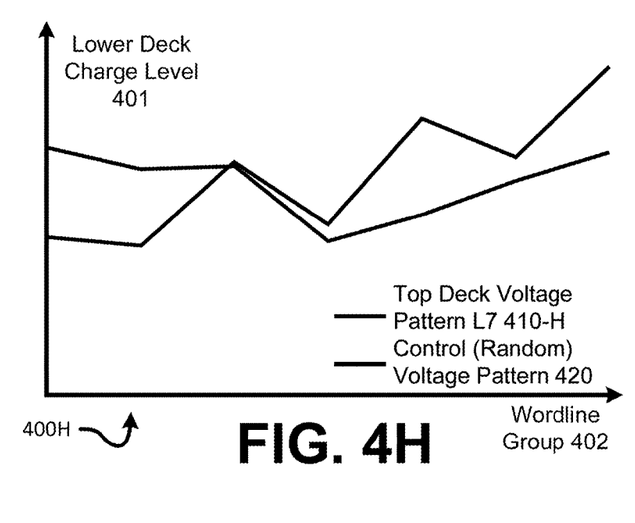

FIGS. 4A-4H illustrate example graphs 400A-400H of a non-defective bottom deck charge level with respect to a given defective top deck voltage pattern 410, in comparison to a control (random) pattern 420, in accordance with some embodiments of the present disclosure. In some embodiments, where a programming algorithm programs bottom-to-top, the non-defective deck can be the top deck, and the defective deck can be the bottom deck. The y-axis represents the bottom deck charge level 401 (e.g., the non-defective deck) and the x-axis represents the wordline group 402 of the bottom deck and corresponding top deck wordline group. The gray line represents the charge level of the bottom deck in response to a specified top deck voltage pattern 410. The black line represents the charge level of the bottom deck in response to a control (random) voltage pattern 420. The control (random) voltage pattern 420 can reflect a pattern in a non-defective deck of a non-defective block (i.e., where both the top deck and the bottom deck are non-defective). In some embodiments, a top deck voltage pattern 410 can have a minimal effect on the bottom deck charge level 401 if the gray line (i.e., the top deck voltage pattern 410 line) and the black line (i.e., the control (random) voltage pattern 420 line) are close (e.g., the lines have a high agreeance, and/or the area between the curves of each line are smaller than for other corresponding voltage patterns). In some embodiments, graphs 400A-400H can be used in conjunction with corresponding plots 310-A to 310-H to determine which voltage pattern of the defective top deck will have a minimal effect on the charge level of a non-defective bottom deck. For example, the box and whisker plot corresponding to L7 310-H of FIG. 3 indicates that L7 320-H median is close to the control (random) median 321, suggesting that a top deck voltage pattern of L7 might have a minimal effect on the charge level of the bottom deck. However, FIG. 4H shows that with respect to FIGS. 4A-4G, upper deck pattern L7 410-H has a low agreeance with control (random) voltage pattern 420, and that there is a large area between the black and gray lines, both of which suggest that a top deck voltage pattern of L7 might not have a minimal effect on the charge level of the bottom deck. Thus, by analyzing both the box and whiskers plot 300 and the corresponding plot 400A-400H, the top deck voltage pattern 410 which will have a minimal effect on the bottom deck charge level 401 can be determined.

Figure 5A:
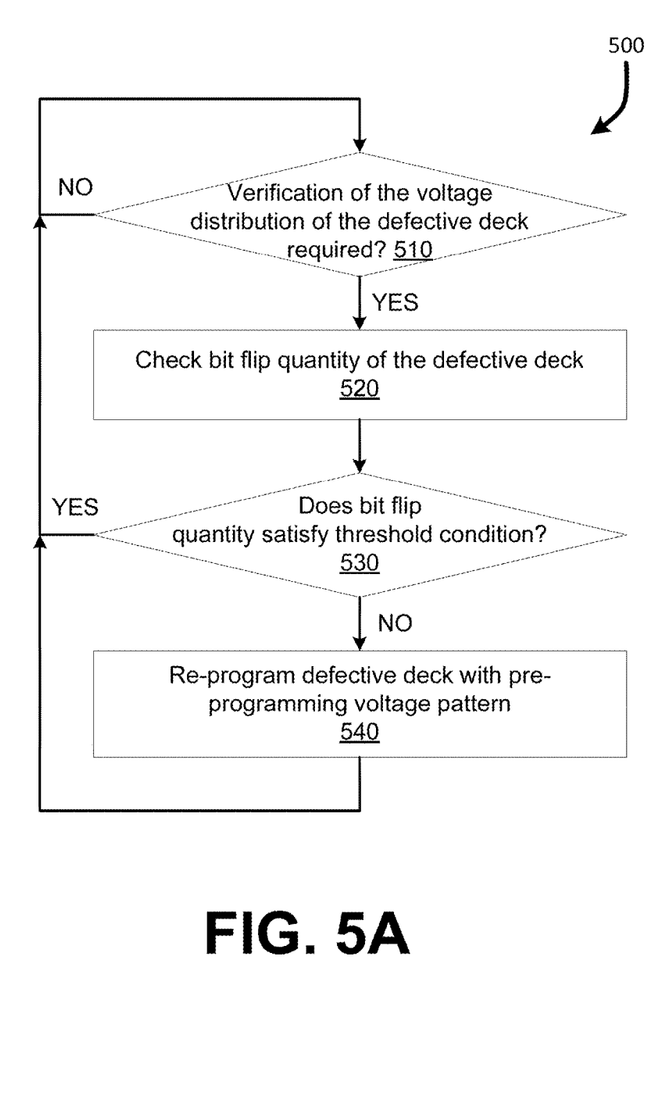
FIG. 5A is a flow diagrams of example method of a verification operation to monitor the voltage distribution of a defective deck of a block, in accordance with some embodiments of the present disclosure.

FIG. 5A is a flow diagrams of example method 500 of a verification operation to monitor the voltage distribution of a defective deck of a block, in accordance with some embodiments of the present disclosure. Method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, method 500 is performed by the deck pre-programming component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, the controller implementing the method 500 determines whether verification of the voltage distribution of the defective deck is required. Verification of the defective deck can be required periodically. In some embodiments, the requirement can be based on a time (i.e., operational duration) or program cycle count (e.g., a program/erase cycle count, etc.). Verification of the defective deck can be required in response to a bad read operation on a corresponding non-defective deck. In some embodiments, the requirement can be based on an error threshold. For example, the controller can monitor a read operation error count for the non-defective deck, and increment the read operation error count for each read operation error on the non-defective deck. When the read operation error count satisfies (e.g., is equal to or greater than) the error threshold, the controller can determine that verification of the voltage distribution of the defective deck is required. Responsive to determining verification is not required, the controller can return to a waiting period, or perform intermediary operations (e.g., the controller can determine whether verification is required as part of a serial set of memory access operations).

At operation 520, responsive to determining that verification is required, the controller checks a bit flip quantity of the defective portion of the block. The controller can monitor the voltage threshold, and by counting the number of voltage thresholds that have moved out of an initial programming window, the controller can determine the number of bit flips that have occurred. In some embodiments, the controller can determine a number of bit flips for a single voltage level. For example, in some embodiments, the controller can determine that a portion of a voltage distribution for a voltage level has shifted out of the initial window, and based on the newly detected position, the controller can estimate a number of bit flips this set of cells has experienced.

At operation 530, the controller determines whether the bit flip quantity satisfies a threshold condition (e.g., whether the bit flip quantity is equal to or greater than a threshold bit flip value). A higher bit flip quantity can indicate a higher likelihood of error, and a lower bit flip quantity can indicate a lower likelihood of error (e.g., verification can be required when the likelihood of error is high). In some embodiments, the bit flip quantity can be determined by performing a read operation on a set of cells and comparing the data from the read operation to data from a program operation. In some embodiments, the bit flip quantity can be determined by counting the number of bits within one or more certain voltage distributions, and subtracting the number of counted bits from the total number of expected bits. For example, data from a read operation can indicate a number of bits in a certain voltage distribution, and the controller can determine whether the expected number of bits minus the number of indicated bits (e.g., expected bits−indicated bits=bit flip quantity) is within a pre-determined tolerance (e.g., bit flip quantity≥threshold condition). The controller can correct bit flips by reprogramming the set of memory cells (e.g., the string of memory cells along the wordline) where one of the voltage distributions has moved outside of initial programming window. In some embodiments, the controller can reprogram the set of memory cells with a pre-programming voltage pattern, such as the pre-programming voltage patterns (e.g., pre-programming voltage patterns 310, and top deck voltage pattern 410 respectively) as described with respect to FIG. 3 and FIGS. 4A-4H.

At operation 540, responsive to conditions of operation 530 failing to be satisfied, the controller re-programs the defective deck with a pre-programming voltage pattern. The pre-programming voltage pattern can correspond to a voltage distribution level of a set of voltage distribution levels of the defective deck. For example, the pre-programming voltage pattern can have a voltage corresponding to a voltage distribution level of the memory device (e.g., the voltage of a level of a MLC, TLC, QLC, etc.). The pre-programming voltage pattern can be pre-determined during production of the memory device. In some embodiments, the controller can determine the pre-programming voltage pattern. The pre-programming voltage pattern can be selected (e.g., pre-determined or determined) based on the effect a defective deck (programmed with the pre-programming voltage pattern) can have on a non-defective deck (programmed with data intended to be stored). In some embodiments, the controller can repeat operations 520 and 530 respectively multiple times before proceeding to operation 540. In some embodiments, the controller can repeat operations 520, 530, and 540 respectively to ensure that the pre-programming voltage pattern has been applied.

Figure 5B:
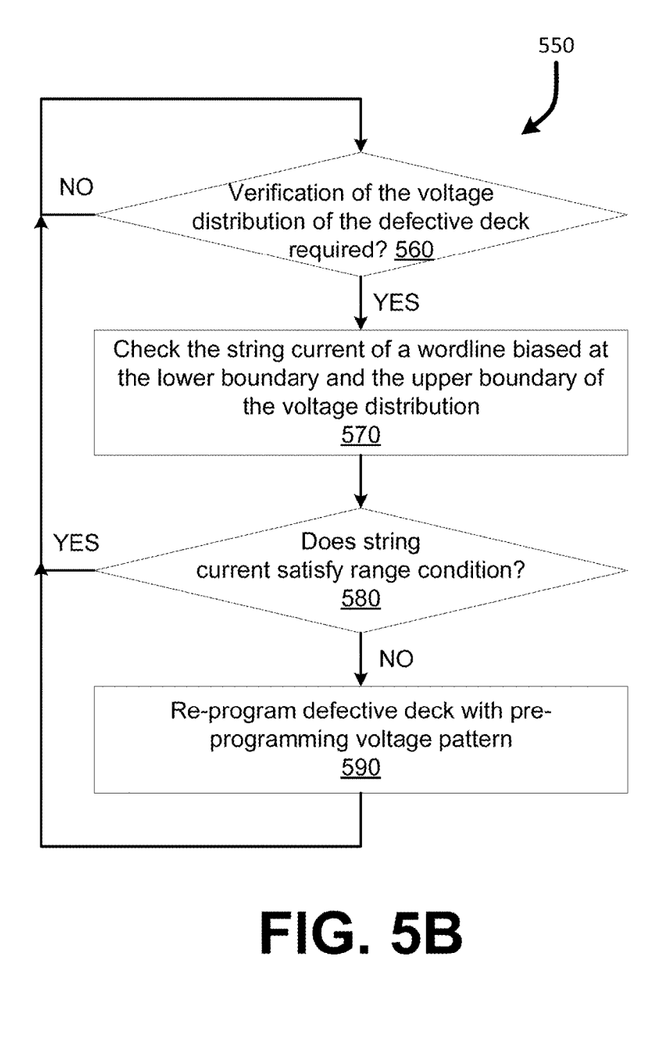
FIG. 5B is a flow diagrams of example method of a verification operation to monitor the voltage distribution of a defective deck of a block, in accordance with some embodiments of the present disclosure.

FIG. 5B is a flow diagrams of example method 550 of a verification operation to monitor the voltage distribution of a defective deck of a block, in accordance with some embodiments of the present disclosure. Method 550 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, method 550 is performed by the deck pre-programming component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 560, the controller implementing the method 550 determines whether verification of the voltage distribution of the defective deck is required. As described above with reference to FIG. 5A, verification of the defective deck can be required periodically. In some embodiments, the requirement can be based on a time (i.e., operational duration) or program cycle count (e.g., a program/erase cycle count, etc.). Verification of the defective deck can be required in response to a bad read operation on a corresponding non-defective deck. In some embodiments, the requirement can be based on an error threshold. For example, the controller can monitor a read operation error count for the non-defective deck, and increment the read operation error count for each read operation error on the non-defective deck. When the read operation error count satisfies (e.g., is equal to or greater than) the error threshold, the controller can determine that verification of the voltage distribution of the defective deck is required. Responsive to determining verification is not required, the controller can return to a waiting period, or perform intermediary operations (e.g., the controller can determine whether verification is required as part of a serial set of memory access operations).

At operation 570, responsive to determining that verification is required, the controller checks the string current of a wordline biased at the lower boundary and the upper boundary of the voltage distribution. In some embodiments, the lower boundary and upper boundary of the voltage distribution are pre-determined during production of the memory device. In some embodiments, the lower boundary and the upper boundary can correspond to a per-cell memory density of the memory device or other memory device characteristics. For example, the lower boundary and the upper boundary for an L1 of a TLC memory device can be different from the lower boundary and the upper boundary for an L1 of a QLC memory device.

At operation 580, the controller determines whether the string current (e.g., an electrical current) satisfies a range condition. The string current (e.g., electrical current across a biased wordline) can satisfy the range condition if the electrical current falls within an acceptable range of electrical current values, (i.e., the range condition). The range condition can be based on a per-cell memory density of the memory device (e.g., the range condition can vary depending on whether the memory device is a MLC, TLC, QLC, etc.). The range condition can be pre-determined during production of the memory device. In some embodiments, the range condition can indicate a lowest acceptable current value, and a highest acceptable current value of the string current (e.g., low current value<string current≤high current value). In some embodiments, the range condition can be a magnitude based on an expected value. For example, for an expected electrical current value, there can be a tolerance of ±a certain current value, and the string current can satisfy the range condition if it falls within the tolerance (e.g., (e.g., expected current value−tolerance current value<string current≤expected current value+tolerance current value). In some embodiments, the range condition can be a single low or high current value which is satisfied when the string current is greater than or equal to, or less than or equal to the range condition respectively (e.g., low current≤string current; and string current≤high current, respectively). The range condition can be a threshold or set of thresholds of string current values that correspond to an initial programming position of a voltage distribution. Due to on-device conditions and various effects, some drift of the voltage distribution from the initial programming position can be expected, and thus the range condition can reflect an acceptable voltage distribution shift. In some embodiments, the amount of an acceptable voltage distribution shift can be pre-determined during production of the memory device.

At operation 590, responsive to conditions of operation 580 failing to be satisfied, the controller re-programs the defective deck with a pre-programming voltage pattern. As described above with reference to FIG. 5A, the pre-programming voltage pattern can correspond to a voltage distribution level of a set of voltage distribution levels of the defective deck. For example, the pre-programming voltage pattern can have a voltage corresponding to a voltage distribution level of the memory device (e.g., the voltage of a level of a MLC, TLC, QLC, etc.). The pre-programming voltage pattern can be pre-determined during production of the memory device. In some embodiments, the controller can determine the pre-programming voltage pattern. The pre-programming voltage pattern can be selected (e.g., pre-determined or determined) based on the effect a defective deck programmed with the pre-programming voltage pattern can have on a non-defective deck. In some embodiments, the controller can repeat operations 570 and 580 respectively multiple times before proceeding to operation 590. In some embodiments, the controller can repeat operations 570, 580, and 590 respectively to ensure that the pre-programming voltage pattern has been applied.

Figure 6:
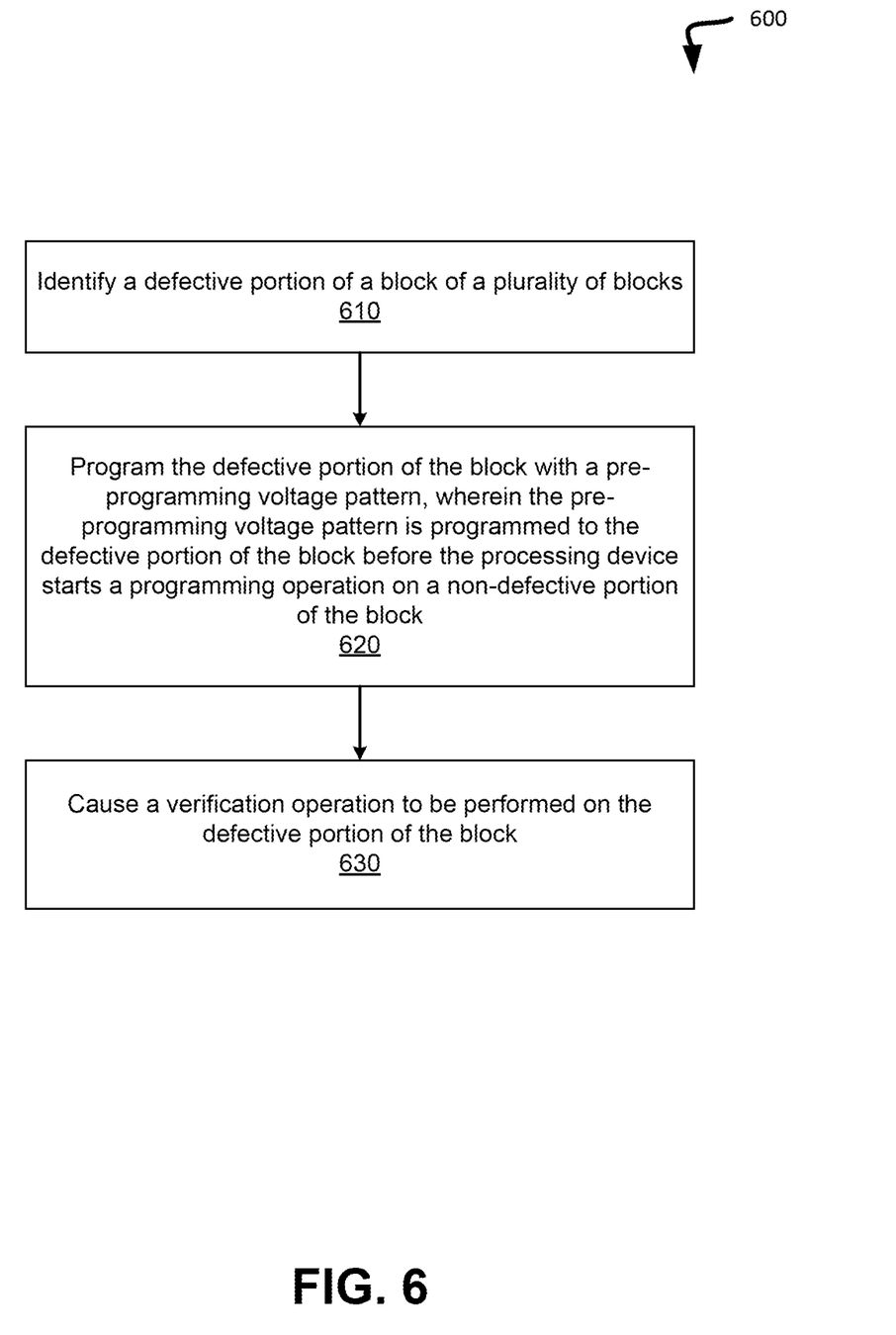
FIG. 6 is a flow diagram of an example method in accordance with some embodiments of the present disclosure.

FIG. 6 is a flow diagram of an example method 600 in accordance with some embodiments of the present disclosure. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by the deck pre-programming component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 610, the controller implementing the method 600 identifies a defective portion of a block of a plurality of blocks. The block can include multiple decks as described above. The defective portion of the block can include multiple decks of the block. The non-defective portion of the block can include the deck(s) of the multiple decks that are not defective. The block can be a half-good block, such as upper half good block 200A or lower half good block 200B as described with respect to FIG. 2. The memory device can program the block using a top-down programming algorithm. In some embodiments, the block can be programmed with other programming algorithms, such as a bottom to top programming algorithm, etc.

In some embodiments, the defective portion of the block can be identified in a manufacturing environment for manufacturing the memory device. A validator (i.e., a memory validation system) in the manufacturing environment can identify defective portion(s) of blocks in a memory device. The memory validation system can send a defective block indication identifying one or more defective portions of the block (i.e., defective decks) to a memory controller associated with the memory device (e.g., such as memory sub-system controller 115 or local media controller 135 as described with respect to FIG. 1).

At operation 620, the controller programs the defective deck (i.e., the top deck in a lower half-good block programmed by a top-down algorithm) with a pre-programming voltage pattern, wherein the pre-programming voltage pattern is programmed to the defective deck before the processing device starts a programming operation on a non-defective portion of the block (i.e., the bottom deck in a lower half-good block programmed by a top-down algorithm). As described above with reference to FIG. 5A and FIG. 5B, the pre-programming voltage pattern can correspond to a voltage distribution level of a set of voltage distribution levels of the defective deck. For example, the pre-programming voltage pattern can have a voltage corresponding to a voltage distribution level of the memory device (e.g., the voltage of a level of a MLC, TLC, QLC, etc.). The pre-programming voltage pattern can be pre-determined during production of the memory device. In some embodiments, the controller can determine the pre-programming voltage pattern. The pre-programming voltage pattern can be selected (e.g., pre-determined or determined) based on the effect a defective deck programmed with the pre-programming voltage pattern can have on a non-defective deck (programmed with data intended to be stored). In at least one embodiment, the pre-programming voltage pattern can have a voltage pattern corresponding to a level 3 (L3) of a TLC memory device.

Based on a defective deck indication (which can be obtained, for example, during operation 610 as described above), the defective top decks of the memory device can be programmed with the pre-programming voltage pattern (i.e., in a pre-programming operation). The defective deck can be programmed with the pre-programming voltage pattern at any time before the non-defective decks are programmed with data to be stored. For example, the defective deck can be programmed with the pre-programming voltage pattern immediately preceding a programming operation, after an erase operation, as a part of a manufacturing operation while manufacturing the memory device, etc. In some embodiments, the memory controller can perform the pre-programming operation on the defective portions of the deck in a manufacturing environment. In some embodiments, a component of the manufacturing environment can perform the pre-programming operation on the defective portions of the block while the memory device is in the manufacturing environment.

At operation 630, the controller causes a verification operation to be performed on the defective deck. The verification operation can be used to determine whether the voltage pattern programmed to the defective deck (i.e., the pre-programming voltage pattern) has shifted from an initially programmed pattern. In some embodiments, when it is determined the voltage pattern of the defective deck has shifted beyond the initial pre-programming voltage pattern, the controller can re-program the pre-programming voltage pattern to the defective deck. In some embodiments, the verification operation can be method 500 as described above with reference to FIG. 5A, or method 550 as described above with reference to FIG. 5B.

The verification operation can indicate whether the voltage pattern of the defective deck satisfies a threshold condition. For example, where the pre-programming voltage pattern corresponds to a certain voltage distribution level, the verification operation can indicate whether the voltage distribution level of the defective deck has shifted farther from the pre-programming voltage pattern than a pre-determined threshold (i.e., the threshold condition). Responsive to the verification operation indicating that the voltage pattern of the defective deck satisfies the threshold condition, the controller can re-program the defective deck with the pre-programming voltage pattern. The controller can re-program the defective deck as a part of the verification operation, or in a separate operation. In some embodiments, the controller can re-program the defective deck before performing a programming operation on the corresponding non-defective deck. In some embodiments, the controller can re-program the defective deck after performing an erase operation on the corresponding non-defective deck.

In some embodiments, the verification operation can determine whether a quantity of bit flips for a subset of the defective deck satisfies an error threshold. The quantity of bit flips can correspond to a voltage shift of the voltage pattern programmed on the defective deck. For example, a larger voltage shift of a programmed voltage pattern can correspond to a larger quantity of bit flips, and conversely, a smaller voltage shift of the programmed voltage pattern can correspond to a smaller quantity of bit flips. The error threshold can indicate a maximum number of bit flips that can occur before the voltage pattern of the defective deck stops performing like the initially pre-programmed voltage pattern. In some embodiments, the error threshold (i.e., number of bit flips) can be pre-determined during production of the memory device. Additional details regarding the verification operation based on detecting the number of bit flips are described above with reference to FIG. 5A.

In some embodiments, the verification operation can determine whether an electrical current value across a subset of the defective deck satisfies an electrical current threshold. The electrical current value can correspond to a voltage shift of the voltage pattern programmed on the defective deck. For example, an electrical current value that is higher than the electrical current threshold can indicate that the voltage distribution has shifted one direction, and an electrical current value that is lower than the electrical current threshold can indicate that the voltage distribution has shifted another direction. The electrical current value can be measured between a lower boundary and an upper boundary of the subset of the defective portion. The lower and upper boundaries can be based on memory device characteristics such as a per-cell memory density of the block, (i.e., SLC, MLC, TLC, QLC), and/or the pre-programming voltage pattern. In some embodiments, the lower and upper boundaries can be pre-determined during pre-production of the memory device. In some embodiments, the subset of the defective portion can correspond to a certain voltage distribution level. In some embodiments, the subset of the defective portion can correspond to a wordline or group of wordlines. The threshold condition can correspond to, or include a range of acceptable currents for the subset of the defective deck, and can correspond to the voltage pattern of the defective deck performing like the initially programmed voltage pattern. In some embodiments, the threshold condition (i.e., the current range or series of current ranges) can be pre-determined during pre-production of the memory device. Additional details regarding the verification operation based on detecting the current across a subset of the defective deck (e.g., the current across a wordline biased at a pre-defined lower boundary and a pre-defined upper boundary) are described above with reference to FIG. 5B.

Figure 7:
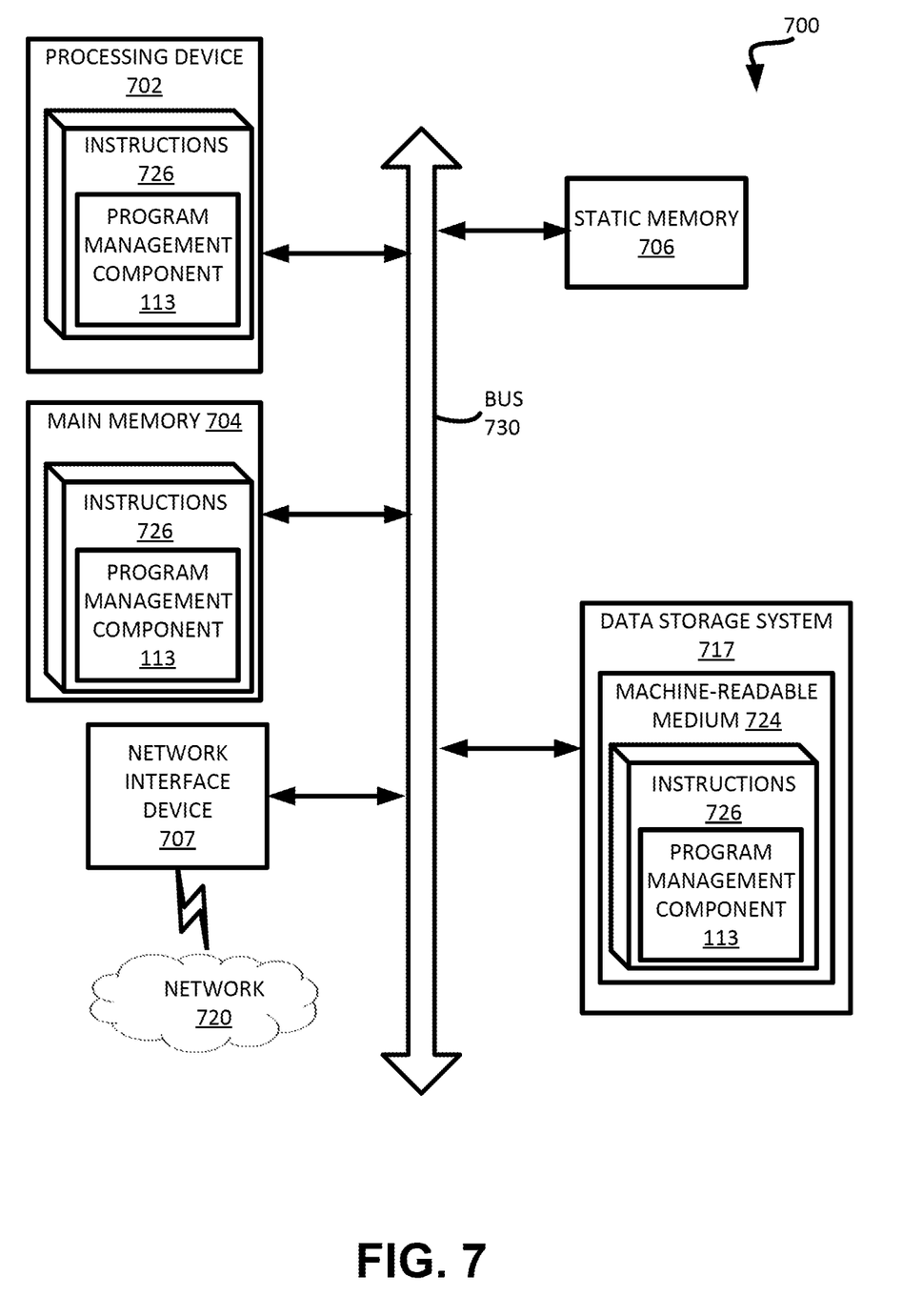
FIG. 7 is a block diagram of an example computer system in which embodiments of the present disclosure can operate.

FIG. 7 illustrates an example machine of a computer system 700 within which a set of instructions, for causing the machine to perform any one or more of the methodologies discussed herein, can be executed. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the deck pre-programming component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or RDRAM, etc.), a static memory 706 (e.g., flash memory, static random access memory (SRAM), etc.), and a data storage system 717, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 can further include a network interface device 707 to communicate over the network 720.

The data storage system 717 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 717, and/or main memory 704 can correspond to the memory sub-system 110 of FIG. 1.

In one embodiment, the instructions 726 include instructions to implement functionality corresponding to a deck pre-programming component (e.g., the deck pre-programming component 113 of FIG. 1). While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
   a memory device comprising a plurality of blocks; and
   a processing device, operatively coupled with the memory device, the processing device to perform operations comprising:
      identifying a defective portion of a block of the plurality of blocks;
      programming the defective portion of the block with a pre-programming voltage pattern, wherein the pre-programming voltage pattern is programmed to the defective portion of the block before a programming operation is performed on a non-defective portion of the block; and
      causing a verification operation to be performed on the defective portion of the block.

2. The system of claim 1, wherein the pre-programming voltage pattern corresponds to a voltage distribution level of a set of voltage distribution levels of the defective portion of the block.

3. The system of claim 2, the operations further comprising:
   responsive to the verification operation indicating that the voltage distribution level of the set of voltage distribution levels satisfies a threshold condition, re-programming the defective portion of the block with the pre-programming voltage pattern.

4. The system of claim 3, wherein the verification operation further comprises:
   determining whether a quantity of bit flips for a subset of the defective portion of the block satisfies an error threshold, wherein the quantity of bit flips corresponds to a voltage shift of the voltage distribution level, wherein the threshold condition comprises the error threshold.

5. The system of claim 3, wherein the verification operation further comprises:
   determining whether an electrical current value across a subset of the defective portion of the block satisfies an electrical current threshold, wherein the electrical current value corresponds to a voltage shift of the voltage distribution level, wherein the threshold condition comprises the electrical current threshold.

6. The system of claim 1, wherein the block of the plurality of blocks comprises a plurality of decks, wherein the defective portion of the block comprises a defective deck of the plurality of decks, wherein the non-defective portion of the block comprises a non-defective deck of the plurality of decks.

7. The system of claim 1, wherein identifying the defective portion of the block of the plurality of blocks further comprises:
   obtaining a defective block indication from a memory validation system of a manufacturing environment for manufacturing the memory device.

8. The system of claim 7, wherein the defective portion of the block is programmed with the pre-programming voltage pattern during a manufacturing operation associated with the manufacturing environment for manufacturing the memory device.

9. A method comprising:
   identifying, by a processing device, a defective portion of a block of a plurality of blocks of a memory device;
   programming the defective portion of the block with a pre-programming voltage pattern, wherein the pre-programming voltage pattern is programmed to the defective portion of the block before a programming operation is performed on a non-defective portion of the block; and
   causing a verification operation to be performed on the defective portion of the block.

10. The method of claim 9, wherein the pre-programming voltage pattern corresponds to a voltage distribution level of a set of voltage distribution levels of the defective portion of the block.

11. The method of claim 10, the operations further comprising:
   responsive to the verification operation indicating that the voltage distribution level of the set of voltage distribution levels satisfies a threshold condition, re-programming the defective portion of the block with the pre-programming voltage pattern.

12. The method of claim 11, wherein the verification operation further comprises:
   determining whether a quantity of bit flips for a subset of the defective portion of the block satisfies an error threshold, wherein the quantity of bit flips corresponds to a voltage shift of the voltage distribution level, wherein the threshold condition comprises the error threshold.

13. The method of claim 11, wherein the verification operation further comprises:
   determining whether an electrical current value across a subset of the defective portion of the block satisfies an electrical current threshold, wherein the electrical current value corresponds to a voltage shift of the voltage distribution level, wherein the threshold condition comprises the electrical current threshold.

14. The method of claim 9, wherein the block of the plurality of blocks comprises a plurality of decks, wherein the defective portion of the block comprises a defective deck of the plurality of decks, wherein the non-defective portion of the block comprises a non-defective deck of the plurality of decks.

15. The method of claim 9, wherein identifying the defective portion of the block of the plurality of blocks further comprises:
   obtaining a defective block indication from a memory validation method of a manufacturing environment for manufacturing the memory device.

16. The method of claim 15, wherein the defective portion of the block is programmed with the pre-programming voltage pattern during a manufacturing operation associated with the manufacturing environment for manufacturing the memory device.

17. A non-transitory computer-readable storage medium comprising instructions that, when executed by a processing device, cause the processing device to perform operations comprising:
   identifying, a defective portion of a block of a plurality of blocks of a memory device;
   programming the defective portion of the block with a pre-programming voltage pattern, wherein the pre-programming voltage pattern is programmed to the defective portion of the block before a programming operation is performed on a non-defective portion of the block; and
   causing a verification operation to be performed on the defective portion of the block.

18. The non-transitory computer-readable storage medium of claim 17, wherein the pre-programming voltage pattern corresponds to a voltage distribution level of a set of voltage distribution levels of the defective portion of the block.

19. The non-transitory computer-readable storage medium of claim 18, the operations further comprising:
   responsive to the verification operation indicating that the voltage distribution level of the set of voltage distribution levels satisfies a threshold condition, re-programming the defective portion of the block with the pre-programming voltage pattern.

20. The non-transitory computer-readable storage medium of claim 17, wherein the block of the plurality of blocks comprises a plurality of decks, wherein the defective portion of the block comprises a defective deck of the plurality of decks, wherein the non-defective portion of the block comprises a non-defective deck of the plurality of decks.

* * * * *